United States Patent [19]
Zwern

[11] Patent Number: 5,245,694
[45] Date of Patent: * Sep. 14, 1993

[54] USER-PROGRAMMABLE VOICE NOTIFICATION DEVICE FOR SECURITY ALARM SYSTEMS

[76] Inventor: Arthur L. Zwern, 170 S. Morrison Ave., San Jose, Calif. 95126

[*] Notice: The portion of the term of this patent subsequent to Mar. 9, 2010 has been disclaimed.

[21] Appl. No.: 693,958

[22] Filed: Apr. 29, 1991

Related U.S. Application Data

[63] Continuation-in-part of Ser. No. 615,212, Nov. 19, 1990, Pat. No. 5,193,141.

[51] Int. Cl.$^5$ ............................................. G10L 9/00
[52] U.S. Cl. ...................................................... 395/2
[58] Field of Search ............................. 381/36–40, 381/51, 81, 82, 86; 395/2; 340/460, 996, 425.5, 426

[56] References Cited

U.S. PATENT DOCUMENTS

| | | | |
|---|---|---|---|
| 4,035,589 | 7/1977 | Parke | 381/82 |
| 4,159,490 | 6/1979 | Wood | 360/12 |
| 4,190,819 | 2/1980 | Burgyan | 340/996 |
| 4,222,028 | 9/1980 | Danchilla | 340/457 |
| 4,276,572 | 6/1981 | Hayashi et al. | 360/12 |
| 4,314,232 | 2/1982 | Tsunoda | 340/460 |
| 4,352,089 | 9/1982 | Yano et al. | 340/460 |
| 4,359,713 | 11/1982 | Tsunoda | 340/460 |
| 4,368,988 | 1/1983 | Tahara et al. | 381/51 |
| 4,371,750 | 2/1983 | Markley | 381/81 |
| 4,389,541 | 6/1983 | Nakano et al. | 381/51 |
| 4,389,639 | 6/1983 | Torii et al. | 340/539 |
| 4,410,884 | 10/1983 | Heiland | 340/545 |
| 4,426,691 | 1/1984 | Kawasaki | 369/21 |
| 4,455,551 | 6/1984 | Lemelson | 340/539 |
| 4,533,962 | 8/1985 | Decker et al. | 360/5 |
| 4,636,876 | 1/1987 | Schwartz | 381/51 |
| 4,642,612 | 2/1987 | Crump | 340/541 |
| 4,698,776 | 10/1987 | Shibata | 395/2 |
| 4,794,368 | 12/1988 | Grossheim et al. | 340/426 |
| 4,839,749 | 6/1989 | Franklin | 360/12 |
| 4,856,072 | 8/1989 | Schneider | 381/86 |
| 4,897,630 | 1/1991 | Nykerk | 340/426 |
| 4,987,402 | 1/1991 | Nykerk | 340/426 |

OTHER PUBLICATIONS

Croisier, "Progress in PCM and Delta Modulation: Block-Companded Coding of Speech Signals," IBM France Centre d'Etudes et Recherches, Zurich Seminar, 1974, pp. 1–4.

Born, "Industrial Electronics", (Jan., 1988); IEEE, Technology 1988, pp. 50–52.

Consumer Reports, "Auto Alarm Systems", (Oct., 1986); pp. 658–662.

Kaplan, Lerner, "Realism In Synthetic Speech", (Apr., 1985); IEEE, Advanced Technology Computers, pp. 32–37.

*Primary Examiner*—David D. Knepper
*Attorney, Agent, or Firm*—Robert O. Guillot

[57] ABSTRACT

A device for receiving, storing and replaying a user created audio messages from a vehicle, building or area, that includes an input device for inputting the user's messages, a signal processor for compressing the messages, and integrated circuit memory devices for storing the messages in a randomly addressable manner. Any one of the various messages may be broadcast by the user at any time at the selection of the user. Additionally, the device may be triggered by an alarm or other sensor means to broadcast preselected user messages in the event that the alarm or sensor is triggered.

31 Claims, 11 Drawing Sheets

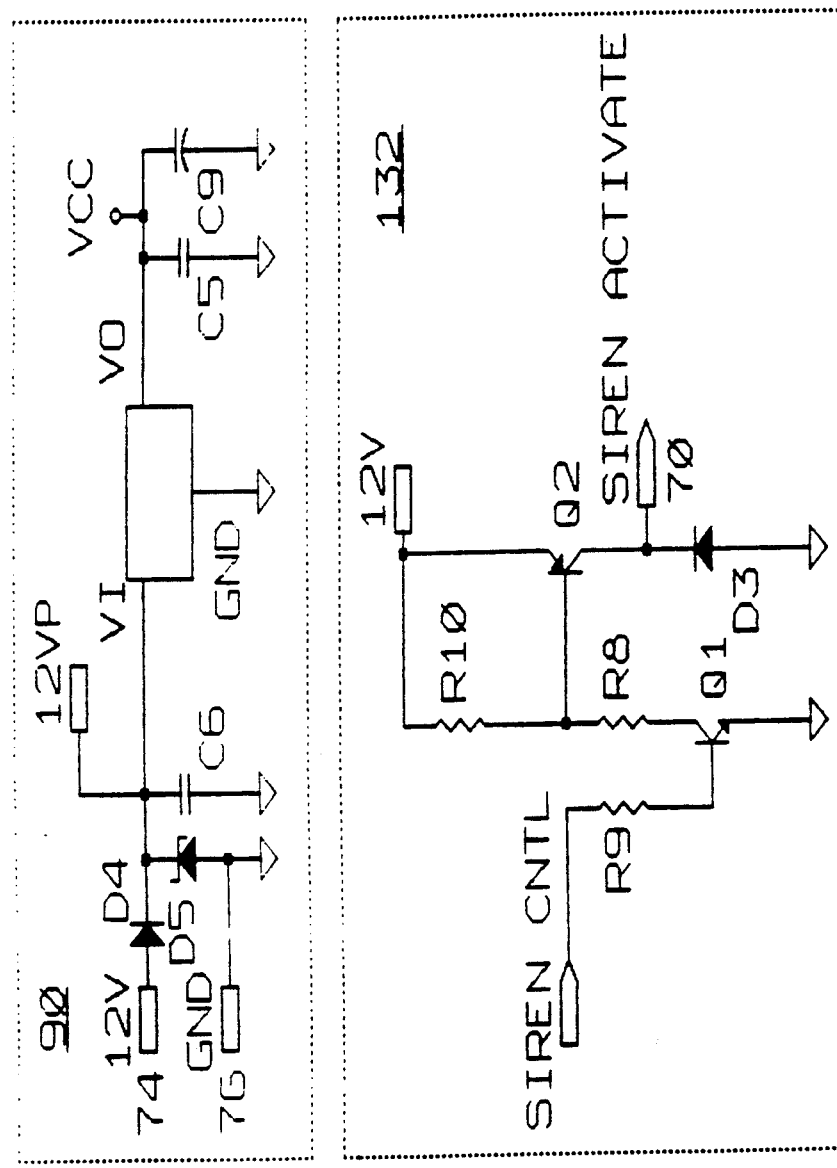

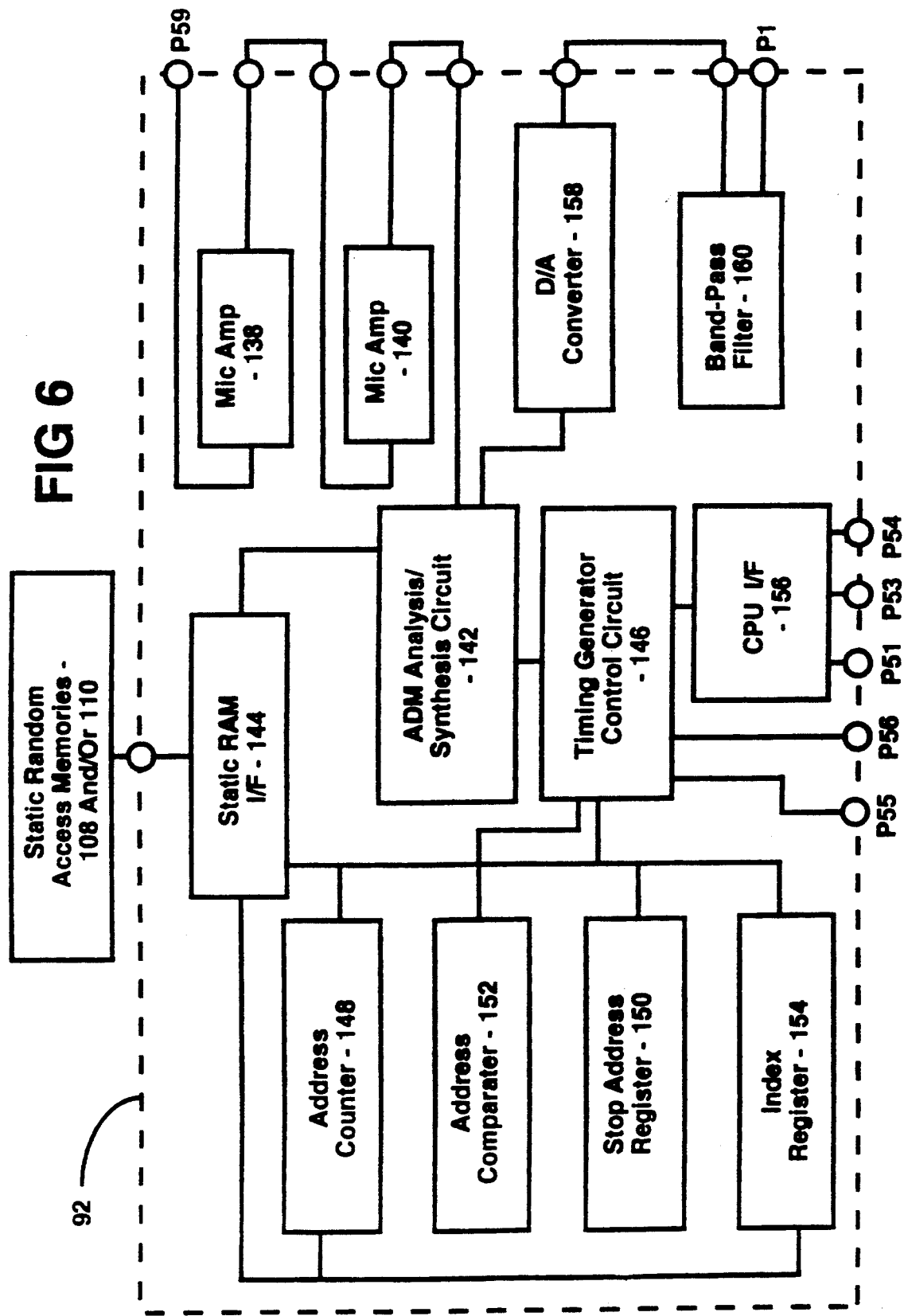

USER-PROGRAMMABLE VOICE NOTIFICATION DEVICE FOR SECURITY ALARM SYSTEMS

CROSS-REFERENCE TO RELATED APPLICATION

This application is a continuation-in-part of my prior U.S. patent application Ser. No. 07/615,212, filed Nov. 19, 1990, now U.S. Pat. No. 5,193,141, entitled: "Vehicular Voice Storage, Playback, and Broadcasting Device".

BACKGROUND OF THE INVENTION

1. Field Of The Invention

The present invention relates generally to storage and retrieval of spoken and audio messages in vehicular environments and other security zones, and is more particularly concerned with a system that allows repeated temporary storage and replay of spoken and audio messages either at its user's discretion, or in response to conditions of a vehicle, building, or zone, with such messages reproduced through an audio system that broadcasts a likeness of the user's audio input.

2. Description Of The Prior Art

In the prior art, there have been developed various devices for permanently storing and replaying factory-programmed voice messages for purposes of warning drivers regarding features of the driver's own vehicle, such as open doors, seatbelts not fastened, or the vehicle's position with respect to external landmarks. Such systems are now factory installed in many vehicles, and the art is well known.

Nonetheless, none of the systems described in the prior art are capable of storing customized messages at the command of the vehicle's user for replay based on triggering by preselected mechanical events such as security violations, but instead replay factory-programmed messages. Additional weaknesses of these systems are that since the voice messages must be factory-programmed, they do not allow arbitrarily selected new messages to replace old messages at the user's discretion, and the messages are not played back in the user's voice or even necessarily in the user's native language. A further weakness is that these systems use a tape recorder, disk, or drum to store analog voice recordings which is bulky and unreliable, or they use voice synthesis electronics which results in poor intelligibility and a machine-like vocal quality.

There have also been developed various devices capable of storing arbitrary user-spoken voice information using a tape recorder, and playing back that information to the occupants of the vehicle in which the recorder is installed. Some such systems have been integrated within systems that provide vehicle feature warnings, however, none of the systems referred to are capable of replaying messages at a volume suitable for broadcasting to listeners outside of the vehicle in which playback occurs, nor are any of the systems capable of replaying the user's own voice in response to features of the vehicle such as open doors or alarm triggered. An additional weakness of the systems referred to is that due to the use of tape recorders as a storage medium, they are less reliable and are bulkier than systems utilizing electronic voice storage, and they can not conveniently replay stored messages instantaneously in any random order. Also, many of these systems are extremely complex to use and install, are incorporated as a portion of a more comprehensive vehicle warning system, or require factory installation by the vehicle's manufacturer.

Most recently there have been developed devices for vehicular and local area security that rely on broadcasting voice messages in response to events such as triggering of door sensors or proximity sensors. Some such devices have incorporated integrated circuit means for storing messages that allow microprocessor-selectable instantaneous playback of any of several messages, however, none of these systems allow for erasure and rerecording of messages by the end user, and in fact, none incorporate a microphone or other direct voice input means. Instead, these systems rely on assembling each unit only after its messages are factory programmed using a complex process involving recording, digitizing, and permanently programming the messages into a read-only memory circuit using an expensive programming instrument. Because of this requirement, an additional weakness of these systems is that all messages must be recorded simultaneously, and can not be recorded individually at different times. In addition, these devices are either embedded as part of a complete security alarm system, or embedded as part of a secondary proximity alarm system, both of which require use of a complex and expensive programming unit at the point of installation, and both of which limit user choice of security features to those features provided for within the larger system. Finally, because the voice messages must be factory programmed, the vocal warnings and alarms can not unambiguously specify the object being violated by identifying that object within the message; this not only limits the fundamental attention-attracting benefit of the alarm during violations, but also neglects to overcome a primary shortcoming of conventional non-speech alarms, which is the inability to differentiate the user's own alarm from another individual's alarm when a false alarm occurs.

U.S. Pat. No. 4,839,749 issued Jun. 13, 1989 to Franklin, discloses a vehicle safety and personal message system that is designed to provide playback of factory-programmed spoken messages to vehicle occupants in response to actuation by vehicle sensors, and to provide playback of user-recorded messages at dates and times selected via an alarm clock. The device incorporates a tape recorder that can be accessed by service technicians for customization of safety messages, and incorporates a removable external microphone that can be inserted by the user when accessing the tape recorder for customization of up to two date/time triggered messages.

U.S. Pat. No. 4,426,691 issued Jan. 17, 1984 to Kawasaki, discloses a voice warning device for vehicular occupants that is designed to reproduce a plurality of factory-recorded warning messages in response to preselected abnormal conditions of vehicle sensors, and to repeat the last message played at the will of the driver. The device incorporates a record disc as a recording medium.

U.S. Pat. No. 4,389,639 issued Jun. 21, 1983 to Torii et al, discloses a voice warning device that provides factory-programmed synthesized voice warnings over the same speakers that are connected to the vehicle radio or cassette player. Additionally, the device incorporates circuitry that controls the radio or cassette volume level and the warning volume level to allow the warning to be heard above the sound of the radio or cassette.

U.S. Pat. No. 4,352,089 issued Sep. 28, 1982 to Yano et al, discloses a factory-programmed synthesized voice warning system for automotive vehicles that adjusts its output volume according to the volume of the audio system provided in the vehicle. Additionally, the device enables the vehicle occupants to select and playback messages regarding features of the vehicle at will.

U.S. Pat. No. 4,190,819 issued Feb. 26, 1980 to Burgyan, discloses a motor vehicle information system having a tape recorder that can automatically deliver sequential factory-recorded messages at predetermined intervals, in response to the vehicle's odometer.

U.S. Pat. No. 4,794,368 issued Dec. 27, 1988 to Grossheim et al, discloses an automotive security alarm system incorporating factory programmed synthesized speech means integrated within the alarm controller for broadcasting violation events, communicating menu options, and reporting violation events.

U.S. Pat. No. 4,897,630 issued Jan. 30, 1990 to Nykerk, discloses an automotive security alarm system incorporating a proximity sensor that triggers a voice warning upon entry into a protected zone, followed by a spoken countdown, followed by triggering of an alarm violation event if the entry is not reversed during a pre-set time period. Additionally, the device can be programmed on a one time basis with a set of customized messages at the factory, by digitizing prerecorded messages and burning those messages permanently into the contents of a programmable read-only memory device.

U.S. Pat. No. 4,987,402, issued Jan. 22, 1991 to Nykerk, discloses an automotive security accessory device based on U.S. Pat. No. 4,897,630 that separates into a secondary alarm system the functions of radio frequency proximity sensing, factory-programmed verbal warning, countdown, and alarm triggering if entry is not reversed, and permits said secondary alarm to be interfaced with a conventional primary alarm system, where said primary alarm system incorporates door, hood, collision, and other sensors, a central processing unit, and a separate siren and/or other signaling device. In addition, the device allows the user to select modes of operation that provide only proximity warnings without countdown and triggering, or that turn off the accessory unit to allow unmodified operation of the primary alarm.

Recently, another prior art device relating to the current invention have been introduced commercially, though no patent information has been found. This is a system that allows repeated storage and playback of written messages to individuals outside the host vehicle, using light emitting diode arrays positioned in the vehicle rear window or on the vehicle's rear license plate frame. These systems suffer from several weaknesses, in that they require typing to program, are subject to readability problems in bright sunlight, and are only capable of communicating messages in a direction directly posterior to the host vehicle.

SUMMARY OF THE INVENTION

It is therefore an object of the current invention to provide a vehicular message storage, retrieval, and playback system that allows erasure and re-recording of stored audio messages at the user's command, and allows playback of such messages through an audio system that broadcasts a likeness of the user's audio input.

It is another object of the current invention to provide a vehicular message storage, retrieval, and playback system that allows playback of stored messages in response to conditions of or adjacent to the vehicle, and allows playback of such messages through an audio system that broadcasts a likeness of the user's audio input.

It is a further object of the current invention to provide a vehicular message storage, retrieval, and playback system that incorporates a combination of improved reliability, smaller size, higher convenience, user-installability, and improved reproduction quality, by using electronic memory for audio storage.

It is yet another object of the current invention to provide a novel and improved means for communication from vehicles via storing audio messages, retrieving such messages, and broadcasting such messages external to the host vehicle, through an audio system that broadcasts a likeness of the user's audio input.

It is yet a further object of the current invention to provide a novel and improved means for communicating from vehicles in all directions, for purposes of requesting assistance or announcing conditions of the vehicle.

It is yet a further object of the current invention to provide enhanced performance to security alarm systems of all types via addition of audio messages that can be customized to specify the object, zone, building, or vehicle that is protected or that is being threatened or disturbed.

It is yet a further object of the current invention to provide a novel and improved means of incorporating audio messages within security alarm systems without requiring external recording, digitizing, or programming equipment for storing messages.

It is yet a further object of the current invention to provide security alarm users with the ability to repeatedly erase and re-record customized audio messages at the will of the user.

It is yet another object of the current invention to provide security alarm users with the means to erase and re-record one or more of a plurality of messages at will, and to broadcast said messages in response to respective but distinct conditions of the protected object, zone, building, or vehicle.

It is yet another object of the current invention to provide a self-contained device that can be added to a wide variety of previously installed security alarm equipment for purposes of adding a plurality of user-recordable audio messages that can be broadcast in response to conditions detected by or effected upon said alarm equipment.

It is still another object of the current invention to provide a second embodiment that combines within one package a processor that performs a variety of security alarm signal processing functions with a processor that performs user-customizable audio recording and playback.

It is still another object of the current invention to provide a third embodiment that combines both speech and security siren audio transducer output means within a single audio transducer device.

It is still another object of the current invention to provide a circuit that can be easily adapted for use in a variety of devices employing concise, user-recorded message retrieval, including telephone ringers, door bells, robotics, vending machines, and many other consumer related products.

In accordance with the present invention, there has been devised a convenient, low cost method and apparatus for storing, replaying, and broadcasting spoken messages to the environment surrounding host vehicles which is broadly comprised of a means for voice processing intended to be mounted inside the passenger compartment of the host vehicle, and a loudspeaker means for audio output intended to be mounted in the engine compartment or other suitable location on the host vehicle. Said means for voice processing incorporates audio transducer means to accept voice input, electronic means to perform various audio filtering, preamplification, and memory management functions and convert transducer input into a digital, compressed, adaptive delta modulation (ADM) format, and semiconductor means to store messages. Also included in said voice processing means are a software-programmable microprocessor and various means for user-control that together provide for selection of recording, playback, or real-time voice broadcasting modes, selection from between several discrete stored messages, activation and deactivation of recording, playback, and real-time broadcasting, and means for broadcasting at two different volumes. Whenever said control means is triggered to broadcast messages, real-time input is filtered, preamplified, amplified, and output from the voice processor unit, or memory output is reconverted to analog signals, filtered, preamplified, amplified, and output from said unit. This output is fed to said loudspeaker means for audio output, which incorporates audio transducer means for broadcasting audible speech output.

As applied to a convenient message storage and broadcasting device for announcing features of a vehicle or events detected by an alarm system in a building, area, or vehicle, the voice processing device provides means for storing and replaying up to four distinct user-spoken voice messages, using a microprocessor, a specialized voice processing integrated circuit (IC), a static random access memory IC, and various user controls and supporting elements.

One momentary pushbutton switch used as a select button and four light emitting diodes (LED's) are user accessible and connected with the microprocessor, which incorporates software to allow the user to toggle from the alarm/ready mode, sequentially through one recording/playback position for each of the four messages, and back to the alarm/ready mode, with each recording/playback position indicated by a flashing LED while selected.

A second momentary pushbutton switch used as an activate button is connected to the microprocessor with software that activates recording if the activate button is pressed when one of the status LED's is flashing as a result of pressing the select button. When recording is so activated, the user is provided with a visual indication of status by the microprocessor, which lights the appropriate message LED continuously until recording is halted, and then reverts to flashing it. This cessation of recording is achieved either when the user releases the activate button, or by the microprocessor when the storage time available for that message is expired.

When the select button has caused the microprocessor to be in the alarm/ready mode, the microprocessor is connected and programmed so as to allow pressing the activate button to alternatively activate and deactivate a live broadcasting mode that directly couples the microphone through the filtering, preamplification, amplification, volume control, and output sections. This feature provides an extra measure of security, as in the event of danger, it allows real-time broadcasting of a request for assistance, and it allows the user complete flexibility as to the manner of the request that is broadcast. When the live broadcasting mode is activated, the microprocessor lights all four LED's to provide visual indication of status.

Regardless of whether or not live broadcasting is selected, playback of each message can be achieved either by manual means or under control of the processor. The manual means is accomplished without additional circuitry by using software to determine if the select button is held down for an additional one second after toggling to a particular message. If such a holddown condition is detected, the microprocessor causes the indicated message to be played. This is useful for setting volume levels and performing other diagnostics, as well as for additional security protection if a threat to the user occurs at a time when the microphone is not plugged in. During such playback, the associated LED is continuously lit, and reverts to flashing when playback is complete.

The microprocessor controlled playback means is accomplished by programming the microprocessor to monitor key signals output from the security alarm's central control unit and from the alarm's proximity sensor, and to use a truth table programmed in software to determine whether each message should be played under each potential combination of input signals.

When electrically connected to any of a wide variety of commercially available and public domain vehicle security alarm systems, sensors, sirens, and other related hardware that may commonly be connected in turn to those elements, various changes in the input signals to the voice processor are reliably interpreted by software within the microprocessor as resulting from alarm system events commonly known as "armed", "disarmed", "auxiliary sensor triggered", and "alarm activated" by those skilled in the art. These interpretations are used by the microprocessor to trigger playback of respective messages. During playback, a relay means is used to temporarily disable the security alarm system's siren to allow the spoken messages to be heard more clearly. For the case of the "alarm activated" message, additional attention can be attracted by playing that message at a louder volume than the other three messages, and by alternating between broadcasting the voice message stored for that event and enabling several seconds of the security alarm's siren.

In addition to these basic security enhancing functions, the preferred embodiment of the user-programmable voice notification device of the present invention incorporates several other unique and novel security enhancing functions. One is that a visual warning to potential intruders is provided by the invention when the alarm system is in the armed condition, as that condition is sensed by the microprocessor, which causes the four message indicating LED's to flash sequentially from left to right and back.

A second security enhancing function is that the microprocessor is programmed so that if the user leaves the select button at a message record/playback position for five seconds without taking further action to record the message, the invention automatically reverts to the alarm/ready mode. In this mode, no LED's are lit unles the alarm is armed.

A third security enhancing function is that the microprocessor is programmed to detect events that are not described by any of the four message-supported events. When such a non-supported event is detected, the microprocessor does not disable the security alarm system's siren, but allows the alarm system to issue its customary "chirped" messages with the siren instead of issuing any spoken messages.

A fourth security enhancing function is that the invention is connected to the security alarm siren in a fail-safe manner, so that if the wires to or from the invention are cut, the security alarm system will drive the siren as it would in the absence of the invention. Because of this method of connecting to the alarm siren, an intelligent disable mode is easily provided. This mode is alternatively reached and exited by pressing both the select button and the activate button simultaneously, and holding them down together for ½ second. When in this intelligent disable mode, no LED's are lit, no messages can be recorded or played, and the host security alarm system functions exactly as it would in the absence of the invention.

An additional important feature of the present invention resides in the use of a microprocessor means to control the invention, which allows those minimally skilled in the art to easily modify its software to cause the invention to be further enhanced with additional features, or to be customized to respond to different truth tables or to different sets of security alarm system signals as inputs. Such customization allows the invention to be conveniently used in a wide variety of security alarms and other awareness generating applications with suitable activation means available.

An additional important feature resides in the ability to easily incorporate all of the voice processing means comprising the present invention within a single enclosure containing suitable host security alarm control electronics, and thereby achieve a self-contained and complete security alarm system incorporating all of the voice storage and playback features of the invention.

It is an advantage of the current invention that it provides for a vehicular message storage, retrieval, and playback system that allows erasure and re-recording of stored audio messages at the user's command, and allows playback of such messages through an audio system that broadcasts a likeness of the user's audio input.

It is another advantage of the current invention that it provides a vehicular message storage, retrieval, and playback system that allows playback of stored messages at in response to conditions of the vehicle, and allows playback of such messages through an audio system that broadcasts a likeness of the user's audio input.

It is a further advantage of the current invention that it provides a vehicular message storage, retrieval, and playback system that incorporates a combination of improved reliability, smaller size, higher convenience, user-installability, and improved reproduction quality, by using electronic memory for audio storage.

It is yet another advantage of the current invention that it provides a novel and improved means for communication from vehicles via storing audio messages, retrieving such messages, and broadcasting such messages external to the host vehicle, through an audio system that broadcasts a likeness of the user's audio input.

It is yet a further advantage of the current invention that it provides a novel and improved means for communicating from vehicles in all directions, for purposes of requesting assistance, or announcing conditions of the vehicle.

It is yet a further advantage of the current invention that it provides enhanced performance to security alarm systems of all types via addition of audio messages that can be customized to specify the object, zone, building, or vehicle that is protected or that is being threatened or disturbed.

It is yet a further advantage of the current invention that it provides a novel and improved means of incorporating audio messages within security alarm systems without requiring external recording, digitizing, or programming equipment for storing messages.

It is yet a further advantage of the current invention that it provides security alarm users with the ability to repeatedly erase and re-record customized audio messages at the will of the user.

It is yet another advantage of the current invention that it provides security alarm users with the means to erase and re-record one or more of a plurality of messages at will, and to broadcast said messages in response to respective but distinct conditions of the protected object, zone, building, or vehicle.

It is yet another advantage of the current invention that it provides a self-contained device that can be added to a wide variety of previously installed security alarm equipment for purposes of adding a plurality of user-recordable audio messages that can be broadcast in response to conditions detected by or effected upon said alarm equipment.

It is still another advantage of the current invention that it can be embodied in a manner that combines within one package a processor that performs a variety of security alarm signal processing functions with a processor that performs user-customizable audio recording and playback.

It is still another advantage of the current invention that it can be embodied in a manner that combines both speech and security siren audio transducer output means within a single audio transducer device.

It is still another advantage of the current invention that it provides a circuit that can be easily adapted for use in a variety of devices employing concise, user-recorded message retrieval, including automotive cruise control devices, telephone ringers, door bells, robotics, vending machines, and many other consumer related products.

The above and other objects, features, and advantages of the present invention will become more readily understood and appreciated from a consideration of the following detailed description of a preferred embodiment when taken together with the accompanying drawings, which, however, should not be taken as limitative to the present invention but for elucidation and explanation only.

BRIEF DESCRIPTION OF THE DRAWINGS

FIG. 6 is a block diagram showing the key circuit elements within a commercially available voice processing integrated circuit, which is suitable for use in the present invention.

DETAILED DESCRIPTION OF PREFERRED EMBODIMENT

Figure 1:
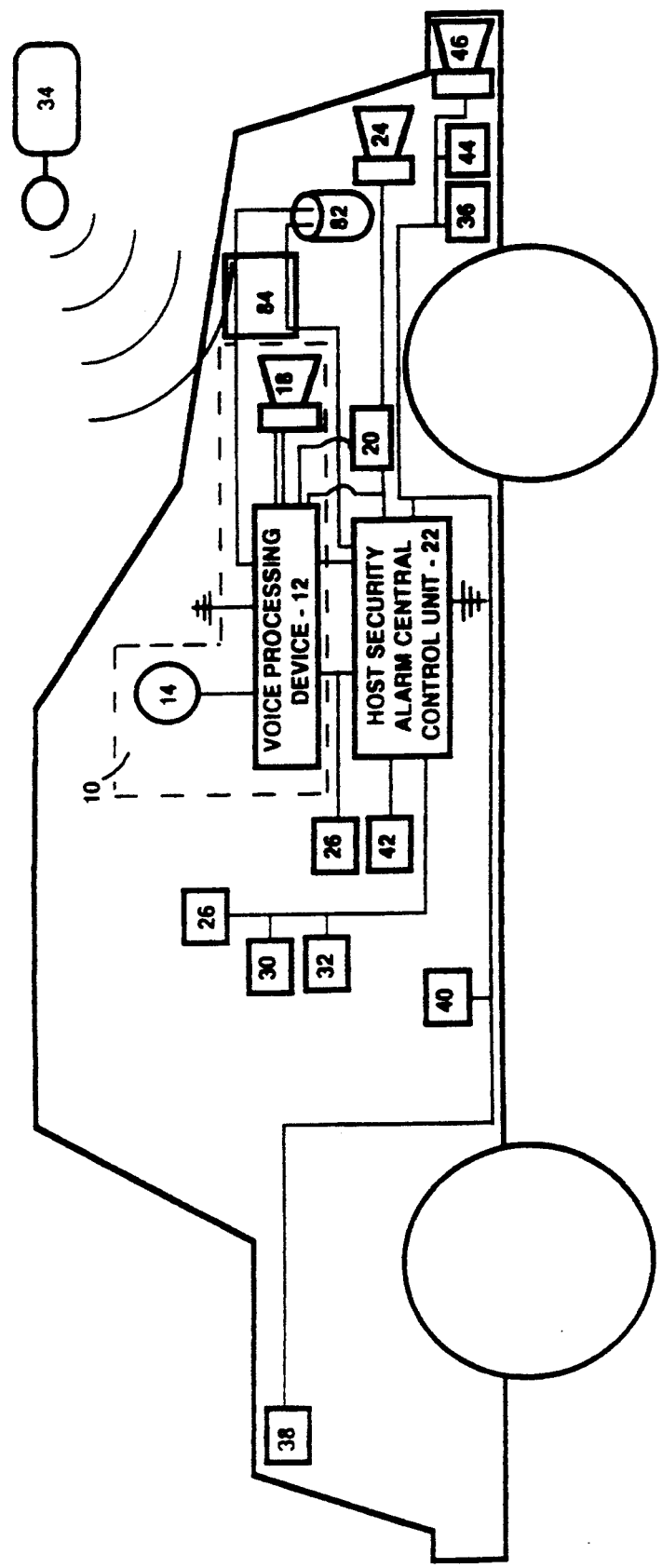
FIG. 1 is a block diagram showing an overview of a typical vehicular security alarm system incorporating the user-programmable vehicular voice notification device of the present invention.

In describing the user-programmable voice notification device of the present invention, it is first useful to provide an overview of a typical host security alarm system that serves to trigger playback from the audio recording and playback module of the present invention. To aid understanding, voice will be assumed as the message source, and a typical, commercially available automotive host security alarm system will be assumed, although throughout the discussion it should be understood that any audio source is possible, while building, zone, or many other types of host security alarm systems may just as easily be used. It should also be understood that the present invention may be designed and applied in a wide variety of embodiments, and the following is not intended to be limitative of the particular embodiments used with and within the invention. Also, it should be understood that in its present embodiment, the invention may be used with said variety of host security alarm systems, but that an embodiment of the invention is also contemplated wherein the present invention and a host security alarm system are each suitably modified so that they may be incorporated within a single module, and so that they may be controlled by a common microprocessor.

Basically, a host security alarm system that may be used with the present invention consists in the general case of a security alarm central control unit, one or more sensors, and a signalling device. In the simplest embodiment, the security alarm central control unit contains a microprocessor with software, or hardwired logic; in either case, it is designed to attract attention by activating the signalling device whenever a sensor's output changes in a manner that indicates the sensor has been violated.

In commercially available embodiments, a wide variety of sensors may be used with such a host security system. For example, in a vehicle such as an automobile, common sensors include door, hood, and trunk sensors (to detect opening of a door, the hood, or the trunk), collision sensors (to sense shock against the vehicle), motion sensors (to detect shaking, or jacking up of the vehicles for purposes of removing wheels), audio sensors (to detect sharp noises, such as glass breakage), light touch sensors (to sense human presence at the vehicle boundary) and proximity sensors (radar, infrared, radio, or acoustic transceivers for detecting human intrusion into an open window or convertible roof). In some cases, multiple proximity sensors may be used, such as where one sensor protects the inside of the vehicle, while a second sensor protects a perimeter area around the vehicle.

Similarly, in common embodiments of host security alarm systems, a wide variety of signalling devices may be used to attract attention to the violated object or area. In vehicles, for example, a multi-pitch 12 volt electric siren is a common embodiment, due to its extremely loud volume, small size, and low cost. Some other common signalling devices used alone or in combination include piezo transducers, the vehicle's horn, headlights, parking lights, radio pagers, and cellular telephone pagers.

Regardless of the particular embodiment of the host security alarm components, several generalities apply. First, the host security alarm system central control unit must be connected to the signalling device, and the electrical signals present in that connection can be monitored to determine whether the alarm is in a violation condition. Second, the host security alarm system can be enabled ("armed") or disabled ("disarmed"), and these events can be unambiguously identified in an analogous manner, such as by monitoring dedicated arm/-disarm output terminals, or by monitoring the signalling device connection for momentary "chirps" used to signal arming/disarming. Third, the various sensors must be connected to the host security alarm central control unit, and one or more of these connections can be monitored for occurrence of a violation event against that sensor. In general all of these conditions are true, even in cases where the connections and signals are all contained within a single enclosure, as is the case for recently introduced "one piece" alarms.

The present invention is conceived as a simple, flexible, and reliable means for adding user-programmable voice notification to any security alarm system, to any arbitray set of sensors, or as a standalone system for voice broadcasting. As presently embodied and described herein, the invention is capable of storing four voice messages, and its inputs and software are configured for optimum utility when connected to many currently commercially available automotive security alarms. While this embodiment is sufficient for complete elucidation of the techniques used in any general embodiment of the invention, it should be understood that many alternative embodiments utilizing different quantities of messages, different definitions of message meanings, different types of protected objects, and different circuit elements may be implemented without difficulty by those skilled in the electronics art.

In the current embodiment, the invention is easily installed as an accessory to an existing or simultaneously installed vehicular alarm system. The procedure is identical in either case, so only the retrofit installation procedure will be described. To install the invention, its voice processing module is mounted inside the passenger compartment, and a loudspeaker is mounted under the vehicle hood and connected to the voice processor. Six wires are then used to integrate the voice processor with the host alarm system, and none of the host alarm system's existing connections need be eliminated or re-routed. First, the existing connection between the host security alarm system central processor and the alarm system's audio signalling device is interrupted, and both resulting wire ends are connected to a relay such that the alarm signal drives the signalling device only when the relay is not driven. One wire from the voice processing module is connected to drive the relay. A second and third wire from the voice processing module are connected to constant (unswitched) 12 volt power and ground.

The fourth, fifth, and sixth wires are connected to the host security alarm system's central processor for purposes of triggering playback of stored voice messages, as follows: one wire is connected to the host alarm's arm/disarm output terminal, one wire is connected to the host alarm central control unit's signalling device output, and one wire is connected to an auxiliary input on the host alarm central control unit. This auxiliary input can be an input from any type of sensor; in typical commercially installed systems, it is often used as an input from a "light touch" sensor, which is an extremely sensitive motion detector that detects the slightest possible disturbance to the vehicle. Such a sensor would falsely trigger too often to be used as a primary siren-triggering sensor.

When connected to a host alarm system in this manner, the present invention allows the user to record four voice messages which are stored for later playback whenever four corresponding security related events occur. First, whenever the alarm is armed, a personalized message such as "see you later George" is played one time. Second, whenever the alarm is disarmed, a message such as "hi George, I've been safe while you were gone" is played one time. Third, whenever the auxiliary input to the host alarm is triggered (as by a light touch sensor), a personalized message such as "stop distrubing George's white BMW" is played one time, and then repeated for as long as the auxiliary input continues to be triggered. Finally, whenever the alarm is triggered such that in the absence of a voice module it would activate its siren to signal a violation, a message such as "stop, thief! Get away from George's white BMW!" is played repeatedly until the host alarm's signalling device output stops sending the violation signal to the siren. To attract maximum attention, this message can be played louder than the other three messages. Because the volume level attainable with even a low cost siren is considerably louder than that available with even a high-powered speech reproduction system (assuming that intelligibility of the voice broadcast must be maintained), attention is further maximized by alternating between playing the voice message and enabling several seconds of the host alarm system's siren.

In addition to controlling playback of the four recorded voice messages, the microprocessor will record the occurrence of any violation event causing the alarm to trigger, and will report such an event at the time of disarming. Since there is no fifth voice message available for such notification, the microprocessor provides the report by allowing the host alarm to "chirp" its siren as it normally would after a violation, instead of playing the "disarmed" voice message.

Referring now to the figures; a description of the best currently implemented mode of practicing the invention will be presented. This description is not to be taken in a limiting sense but is made merely for the purpose of describing the general principles of the invention. The true scope of the invention should be interpreted with reference to the claims as appended hereto.

Referring to FIG. 1, the system of this invention 10 comprises an voice processing device 12 and a microphone element 14 located inside the passenger compartment of the vehicle, a loudspeaker device 18 located in the engine compartment or other suitably protected vehicle location with open-air access to the outside environment, and a relay 20 located at any convenient position within the vehicle.

The invention also connects directly or indirectly with various security system components, representative examples of which are shown. These directly connected components include the security alarm central control unit 22, which performs all decision and control functions for the security system, as well as the alarm siren 24, which serves as the signalling device, and an optional auxiliary sensor 26, which can be directly connected to the voice processing device 12. Representative indirectly connected components include a means for arming/disarming and otherwise controlling the security alarm, which may be a keyboard 28, hidden switch 30, key 32, or a remote transmitter 34. Also indirectly connected are a variety of optional sensors such as a hood sensor 36, a trunk sensor 38, door sensors 40, and a proximity sensor 42. Finally, indirectly connected elements may include standard vehicular components such as exterior lights 44 and emergency horn 46, which may optionally be used as signalling devices by the alarm system, and which may be additionally optionally connected to the voice processing device 12 in a manner analogous to that used for the alarm siren 24.

Figure 2:
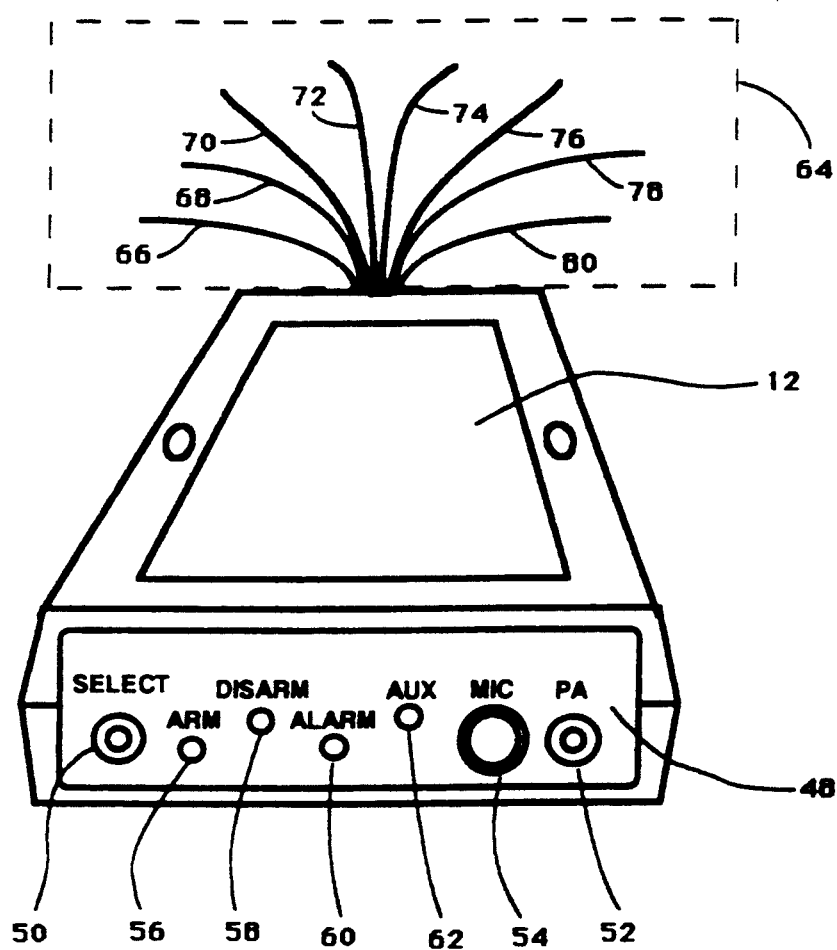
FIG. 2 is a perspective view of a voice processing module, which is used in the user-programmable voice notification device of the present invention.

Referring to FIG. 2, the preferred embodiment of voice processing device 12 incorporates a front panel 48 containing two controls, a select button 50, and an activate button 52. The front panel 48 also contains a microphone jack 54 for connecting microphone 14, and a set of four status LED's (light emitting diodes) 56–62. The individual status LED's 56, 58, 60, and 62 are each labeled with a name reflective of the event that will trigger playback of the message associated with that LED.

At the rear of the voice processing device 12, means for wiring connections 64 are provided, which may be either a single connector with multiple wires, multiple connectors each with one wire, or multiple bare wires. In each case, four wires are used to connect the voice processing device 12 to the security alarm system, including an arm/disarm wire 66, an alarm triggered wire 68, a siren activate wire 70, and, optionally, an auxiliary sensor triggered wire 72. Two wires, a power wire 74 and ground wire 76 are used to provide electrical power to the invention, and two wires, a speaker positive wire 78 and a speaker negative wire 80 are used to connect the voice processing device 12 to the loudspeaker device 18.

Figure 3:
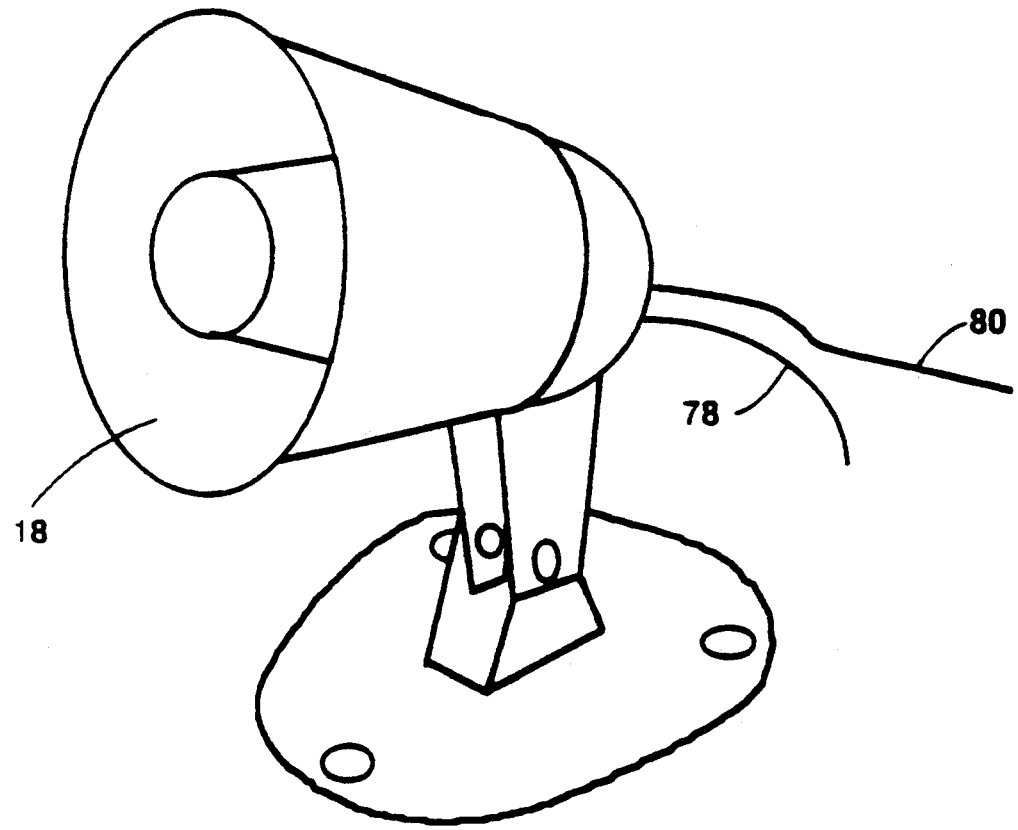
FIG. 3 is a perspective view of a loudspeaker device, which is used in the present invention.

This loudspeaker device 18 is shown in FIG. 3 as a conventional public address system loudspeaker, as used in the present embodiment of the invention. However, an improved embodiment has been contemplated for some applications that would replace both the loudspeaker device 18 and the alarm siren 24 with a loudspeaker device modified to accept and reproduce either speech or siren signals.

To operate the voice notification device 10, the user presses the select button 50 and the activate button 52 simultaneously, which toggles the device between its intelligent disable mode and its ready mode. In the intelligent disable mode, the device retains any stored messages in memory, but will not record, playback, broadcast live, or perform any other function, and appears transparent to the host security alarm system central control unit 22.

Once in the ready mode, messages can be selected by repeatedly pressing the select button 50 until the desired message is reached, at which time that message can be played at the user's discretion by continuing to hold down the select button 50 for at least one second after the chosen message is reached. To record a message, the user simply selects a message using the select button 50, then presses and holds the activate button 52 while speaking or otherwise creating the audio message. If a message is selected but after five seconds no user action has been taken to trigger playback or recording, then the voice processing device 12 automatically returns to the ready mode.

When in the ready mode, the voice notification device 10 constantly monitors the arm/disarm wire 66, alarm triggered wire 68, and optionally, the auxiliary sensor triggered wire 72. If the appropriate signal combination is seen on these wires, the corresponding message is played. Also, if the activate button 52 is pressed while in ready mode without first selecting a message, the voice notification device 10 enters the public address mode, where any audio input presented to the microphone 14 is amplified by voice processing device 12 and broadcast in real time through loudspeaker device 18.

Figure 4:
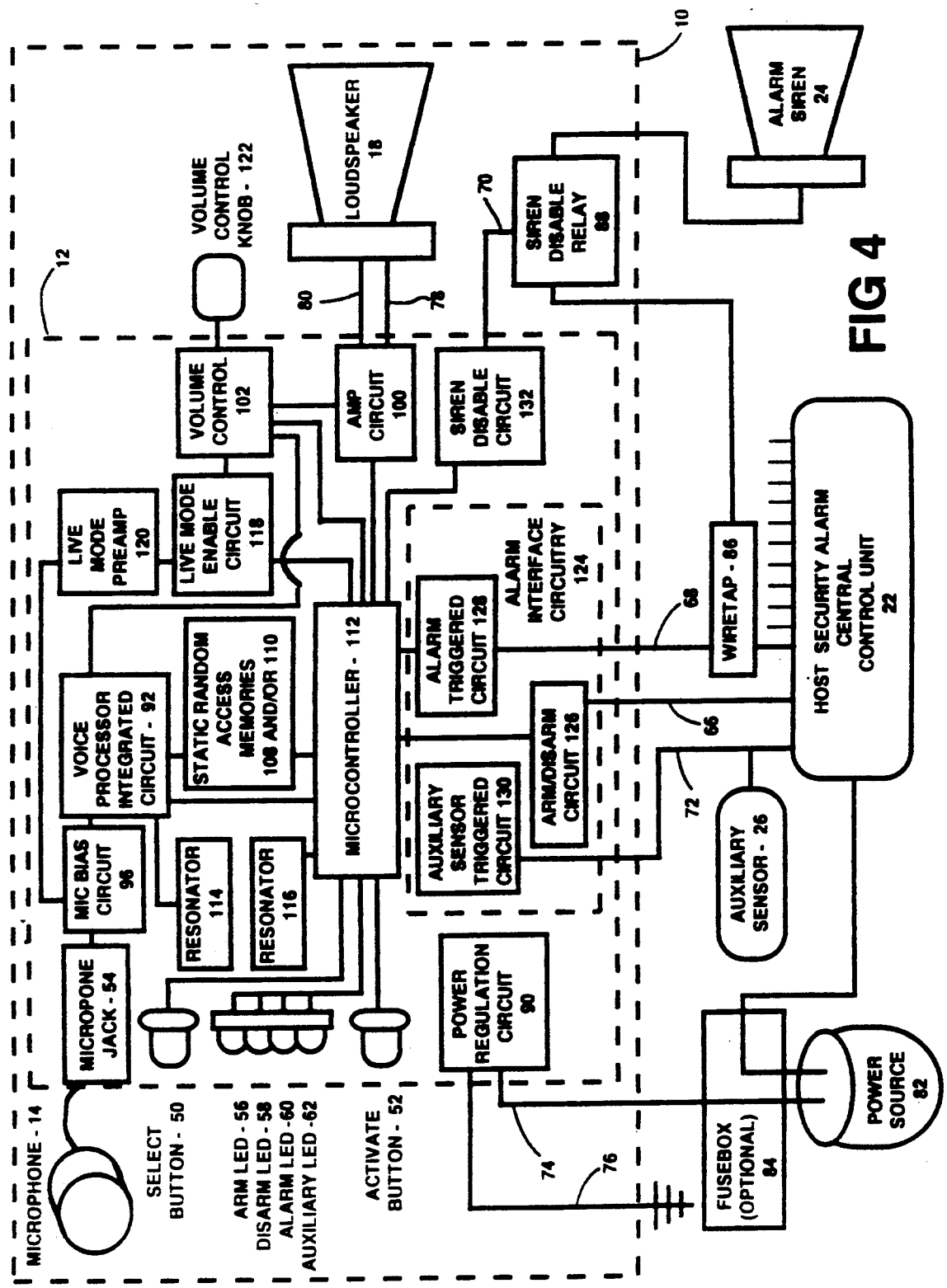
FIG. 4 is a block diagram showing a general construction of a preferred embodiment of a user-programmable vehicular voice notification device according to the present invention.

Referring to FIG. 4, an overview of the key elements of the voice processing device 12 is shown, along with additional detail of the wiring connections between the voice processing device 12, the power source 82, and the existing security alarm components 22, 24, and 26.

The voice processing device 12 is connected by one power wire 74 and one ground wire 76 to a 12 volt battery power source 82, optionally via a vehicle's fusebox 84. This wiring is for constant voltage, and should not be switched by the vehicle's ignition.

The voice processing device 12 is also connected to the security alarm central processing unit 22 via the alarm triggered wire 68 and the arm/disarm wire 66. In the absence of the present invention, the alarm triggered wire 68 would normally be connected only between the security alarm central control unit 22 and the alarm siren 24; this connection is maintained with the current invention, but a wiretap 86 is used to additionally provide this signal to the voice processing device 12.

The voice processing device 12 is also indirectly connected to the alarm triggered wire 68 via siren disable relay 88, which provides extra security protection. This is accomplished by leaving the alarm siren 24 connected to and controlled by the alarm central control unit 22 at all times except when speech is to be broadcast from the voice notification device 10, at which time the alarm siren 24 is disconnected from the security alarm central control unit 22 by activating siren disable relay 88. This scheme allows the security alarm central control unit 22 to function in an independent and unimpeded manner, which is especially useful in case the voice notification system 10 is disabled, damaged, disturbed, faced with unrecognized input signals, or otherwise unable to broadcast.

The voice processing unit 12 is also optionally connected via an auxiliary sensor triggered wire 72 to an auxiliary sensor 26, which may or may not also be connected to the security alarm central control unit 22. This auxiliary sensor 26 may be any sensor for which a spoken message is desired, as the voice processing device 12 is programmed to play the auxiliary message one time each time the sensor's output signal changes from 12 volts to ground. Should the selected auxiliary sensor 26 be of a design where the message should be spoken when the sensor's output signal changes from ground to 12 volts, a simple relay may be used by anyone skilled in the art to reverse the state of the signal along the auxiliary sensor triggered wire 72. Example sensors that may be used as an auxiliary sensor include light touch sensors for "intrusion warning" messages, door sensors for "door-opened" messages, or a vehicle's cruise control system for "desired speed exceeded" messages.

Referring now to specific circuit elements of the voice processing device 12, a power regulation circuit 90 accepts 12 volt input power from power wire 74 and ground wire 76, removes transients, and provides both 12 volt power and regulated 5 volt power to the various elements within voice processing device 12. Also, the power regulation circuit 90 prevents damage to the voice processing device 12 elements in the event that the power inputs are connected with reverse polarity (power connected to ground input, and vice-versa). The connections between the power regulation circuit 90 and the other elements within the voice processing device 12 will be evident to those skilled in the art, and are thus not shown in order to preserve clarity.

Central to the function of the voice processing device 12, a voice processor integrated circuit 92 is incorporated to perform all voice processing functions, including input preamplification, digital to analog conversion, sampling, compression, recording into memory, reading from memory, conversion of data back to analog, audio filtering, and output preamplification. The voice processor integrated circuit 92 incorporates an audio input connection from the output of the microphone 14, which is biased to operating voltage by the mic bias circuit 96. The voice processor integrated circuit 92 also incorporates an audio output connection which connects to the amp circuit 100 and loudspeaker device 18 through the volume control circuit 102. Also, voice processor integrated circuit 92 is connected to the data input/output connections and to the least significant address connections of one or more static random access memories 108 and/or 110, which is where the message data is actually stored.

Voice processor integrated circuit 92 is controlled by microcontroller 112, which incorporates a microprocessor, programmable read only memory, twenty controllable input/output ports, and other circuit elements common to the microcontroller art. The voice processor integrated circuit 92 and microcontroller 112 are clocked by resonator elements 114 and 116. In the present invention, the microcontroller is programmed to control the voice processor integrated circuit 92 and other key circuit elements as will be described.

One key element controlled by the microcontroller 112 is the address region in static random access memories 108 and/or 110 where each message is stored. This is required because voice processor integrated circuit 92 is commercially available only in a configuration that while allowing multiple messages to be stored, requires the messages to be recorded in a predetermined sequential order. This is not desirable for a voice notification device as the user will often want to erase and re-record just one of the multiple available messages without disturbing the other messages. By controlling the two most significant bits of the static random access memories 108 and/or 110's address space using the microcontroller 112, the memory space is artificially divided into four identically sized message spaces, but the voice processor integrated circuit 92 always operates as if it was only recording and playing one message using a single memory region. Within each memory region, the voice processor integrated circuit 92 performs all detailed bit-by-bit memory management functions such as sequencing through the address space during recording and playback, storing start/stop addresses in a header within the static random access memories 108 and/or 110's message space, and triggering reading and writing of data within the memory. By connecting the voice processor integrated circuit 92, the microcontroller 112, and the static random access memories 108 and/or 110 in this way, a device is achieved that provides for non-sequential recording of several independent voice messages, using a voice processor integrated circuit 92 that otherwise does not provide such a capability.

Besides controlling the voice processor integrated circuit 92, the microcontroller 112 also controls a live mode enable circuit 118, which allows the voice notification device to be used as a public address system. The live mode enable circuit 118, when activated by the microcontroller 112, causes the signal from the microphone 14 (as biased by mic bias circuit 96) to be amplified by the live mode preamp circuit 120 and sent through the volume control circuit 102 to the amp circuit 100 and loudspeaker 18. The live mode preamp 120 amplifies the live voice signal by a factor of two hundred, which matches the live volume level to the playback volume level output by the voice processor integrated circuit 92.

The volume control circuit 102 is controlled by a combination of the microcontroller 112 and the volume control knob 122. The microcontroller controls a portion of the volume control circuit 102 that toggles between the maximum available volume level for the alarm-triggered message, and a quieter volume level for the public address mode and the three other messages. The volume control knob 122 is an audio pot that simultaneously raises or lowers both the maximum available volume level and the quieter volume level in proportional amounts. The volume control knob 122 is used to adjust the system so that no audio feedback is present in the live mode, and so that the three non-alarm triggered messages are not obtrusively loud in the user's judgement.

The microcontroller 112 also controls the amp circuit 100, which amplifies the audio signal to a level suitable for broadcasting in an emergency situation. For most applications of the present invention the exact design of the amplifier is not critical, and a wide variety of means with suitably low audio distortion and suitably high audio volume levels may be employed. However, for vehicular environments, two additional requirements serve to limit the particular design of the amp circuit 100. The first requirement is compatibility with a 12 volt power supply, since this level is typical in vehicles. While many amplifiers can function with a twelve volt supply, most provide greater audio output when used with a higher supply voltage. To obtain suitable audio output levels for use in a vehicular voice notification system, an amplifier operating in a bridged mode is used. This amp circuit 100 provides up to 24 watts of output power into an 8 ohm speaker used as loudspeaker 18, when connected to a nominal 12 volt power source 82.

A second requirement of the amp circuit 100 is that when used in vehicles, the voice notification device 10 must draw very little power when quiescent (i.e.; when no messages are actively being played or recorded). This enables the invention to be used without danger of drawing down a vehicle's battery when the vehicle is left in an armed mode without being driven for long periods of time. While all elements of the system except the amplifier naturally draw very little power when no activity is being performed, amplifiers typically draw current even when no input signal is being amplified. To accomplish low current draw under quiescent conditions, the amp circuit 100 is designed to be capable of being enabled and disabled by the microcontroller 112, and to use essentially no power when in the disabled mode. Also, the microcontroller 112 is programmed in software so as to enable the amp circuit 100 immediately before any message is played, and to disable the amp circuit 100 immediately after message playback is complete.

In addition to the audio circuits, the microcontroller 112 is directly connected to each of the four status LED's 56-62, and is programmed to light the LED's in a manner that provides status information to the user. Specifically, when in the ready mode, no LED's are lighted unless the host security alarm is "armed", in which case the status LED's 56-62 flash sequentially from left to right and back. When a message is selected, that message's LED 56, 58, 60, or 62 flashes, while the remainder of LED's 56-62 are off. While the voice processing device 12 is recording a message, that message's LED is lit continuously until recording is halted, but no others are lit. When recording is halted either by releasing the activate button 52 or because the time allocated to a message has expired, the LED resumes flashing. Finally, when in the public address mode, all four LED's 56-62 flash simultaneously.

The foregoing or any similar embodiment thereof can serve as an effective user-programmable voice notification device in a wide variety of applications, using either manual activation of playback or, when suitably connected, externally triggered playback. In any particular application, the functions can be controlled by a microcontroller as in the currently disclosed embodiment, or by discrete logic as has been implemented in an alternative embodiment, with the decision between the two methods based primarily on cost optimization and flexibility for responding quickly to design changes.

In a preferred embodiment of the user-programmable voice notification device 10 as used in the application of a vehicular accessory suitable for interfacing with a wide variety of security alarm systems, additional alarm interface circuitry 124 is incorporated that interfaces between the microcontroller and the user's security alarm system components 22, 24, and 26. This alarm interface circuitry 124 includes an arm/disarm circuit 126 for purposes of collecting signals from the alarm system's arm/disarm wire 66, an alarm triggered circuit 128 for collecting signals from the alarm triggered wire 68, and an auxiliary sensor triggered circuit 130 for (optionally) collecting signals from the auxiliary sensor triggered wire 72. In each case, the alarm interface circuitry converts the incoming 0-12 volt signals into 0-5 volt signals suitable for interpretation by the microcontroller 112 for triggering message playback. This circuitry can be implemented in a variety of embodiments depending on the specific application of the voice processing device 10.

Also in the disclosed embodiment is a siren disable circuit 132, which functions as a relay to convert a 5 volt logic output from the microcontroller 112 into a 12 volt output suitable for driving either a siren or as employed here, a 12 volt siren disable relay 88 that enables and disables the alarm siren 24. This circuit functions such that when the microprocessor determines that the security alarm system is driving its siren in an "alarm triggered" mode, the siren disable circuit 132 is alternatively enabled by the microcontroller 112 for 5 seconds and then disabled for the duration of the appropriate voice message, with such alternating enabling and disabling action continuing for as long as the security alarm system central control unit 22 continues to drive siren activation.

An alternative embodiment of voice notification device 10 similarly provides for automatic activation of playback and broadcasting triggered by an automotive alarm system, and incorporates analogous but distinct means for control. In such an embodiment, the voice processing device 12 is preferably co-located in the engine compartment with the loudspeaker device 18. Another alternative embodiment of loudspeaker device 18 provides for automatic activation of playback within the passenger compartment only, triggered either manually or as a result of vehicle sensors. In such an embodiment, the loudspeaker device 18 is preferably located in the passenger compartment with the voice processing device 12. Hence, when the description given herebelow refers to voice recording, playback, and live broadcasting from vehicles, it should be appreciated that there are many alternate embodiments for implementing control of these functions, and therefore the current invention is not to be limited to the specified items.

Referring now to FIGS. 5A-E, a detailed schematic of the voice processing device 12 is provided in five parts. In the figures, decoupling capacitors and some power and ground connections are omitted for clarity, as will be readily seen and understood by those skilled in the art.

Figure 5H:
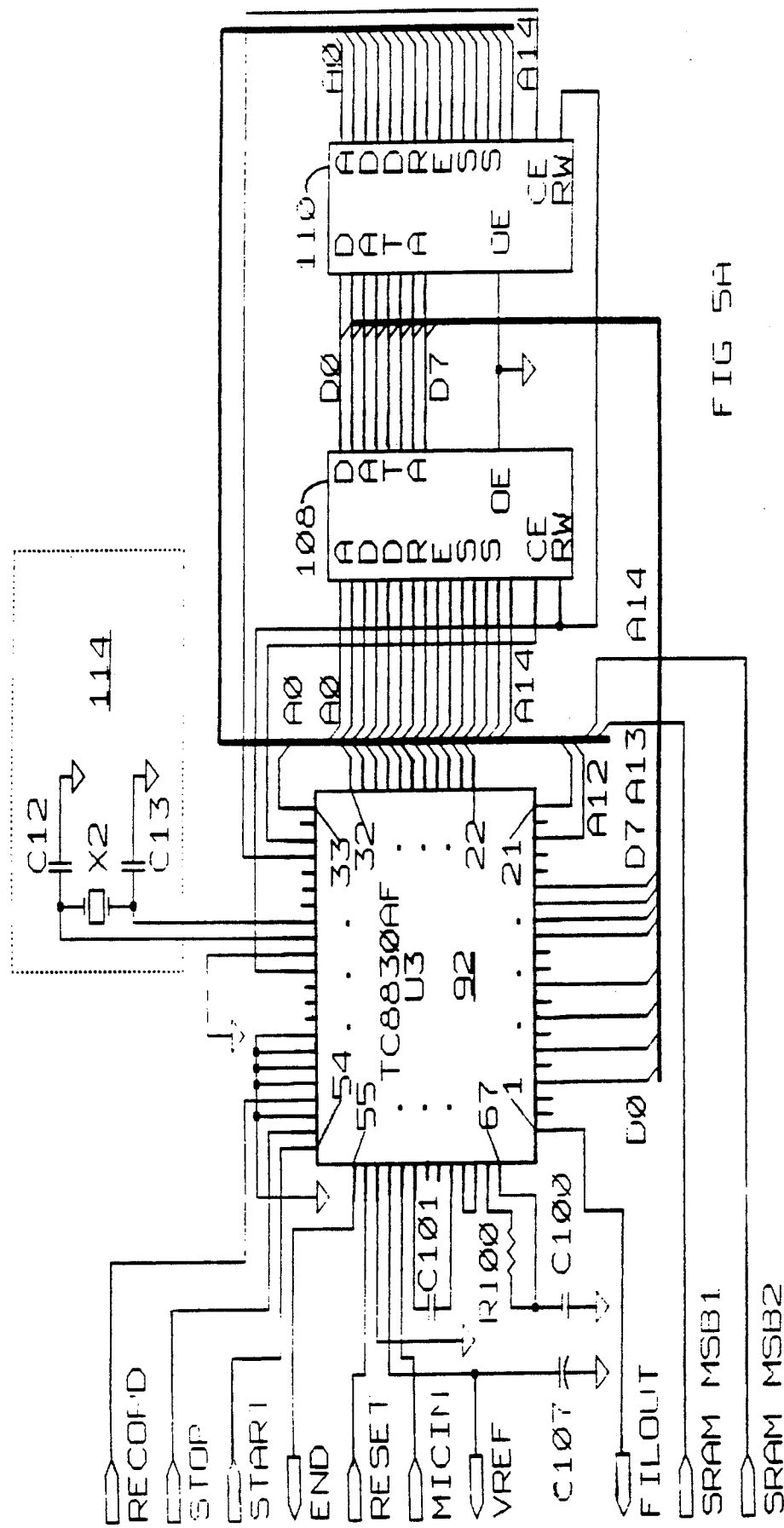
FIGS. 5A-5F are schematic diagrams showing the detailed circuit construction of the switches, controls, and other elements of a voice processing module suitable for use in the current invention.

FIG. 5A shows detail of the connections between the voice processor integrated circuit 92 and static random access memories 108 and 110. Voice processor integrated circuit 92 is commercially available from Toshiba under the part number TC8830AF, and is designed as a general purpose voice messaging device capable of storing and retrieving messages under microprocessor or manual switch control. Analogous parts produced by United Microelectronics, Oki, Texas Instruments, or Information Storage Devices may also be used, with minor circuit changes and in some cases differences in data compression method.

Static random access memory 108 is a standard 32 k×8 bit static random access memory device available from multiple sources. While other memory means such as dynamic random access memory may alternatively be used in place of 108 or 110, static random access memory integrated circuits possess an advantage of requiring very little power whenever data is not being actively written or read. The second static random access memory 110 is identical to 108 and optional, and serves only to increase the available length of each message.

For a given memory size, the available recording time is determined by the sampling rate of the voice processing integrated circuit 92 as driven by the oscillation rate of resonator 114, which is comprised of a commercially available ceramic resonator at position X2, and decoupling capacitors at positions C12 and C13. In the present embodiment, the voice processor integrated circuit 92 is set to sample at 32 khz, which is externally slowed to 28.8 khz by using a commercially available 450 khz ceramic resonator at position 114 rather than the 512 khz resonator called for in the Toshiba documentation. This provides 8.8 seconds of total message storage per 32K×8 bit memory chip, and two such chips are used at positions 108 and 110 to provide 4 messages of 4.4 seconds each. Up to four such memory devices may be used in the embodiment, for a total message length of up to 8.8 seconds for each of the four messages. Alternatively, the sampling rate of the voice processor integrated circuit 92 can be adjusted from 32 khz to 16 khz, 11 khz, or 8 khz, with corresponding increases in message length per memory chip, but at increasingly degraded audio quality.

Figure 5B:
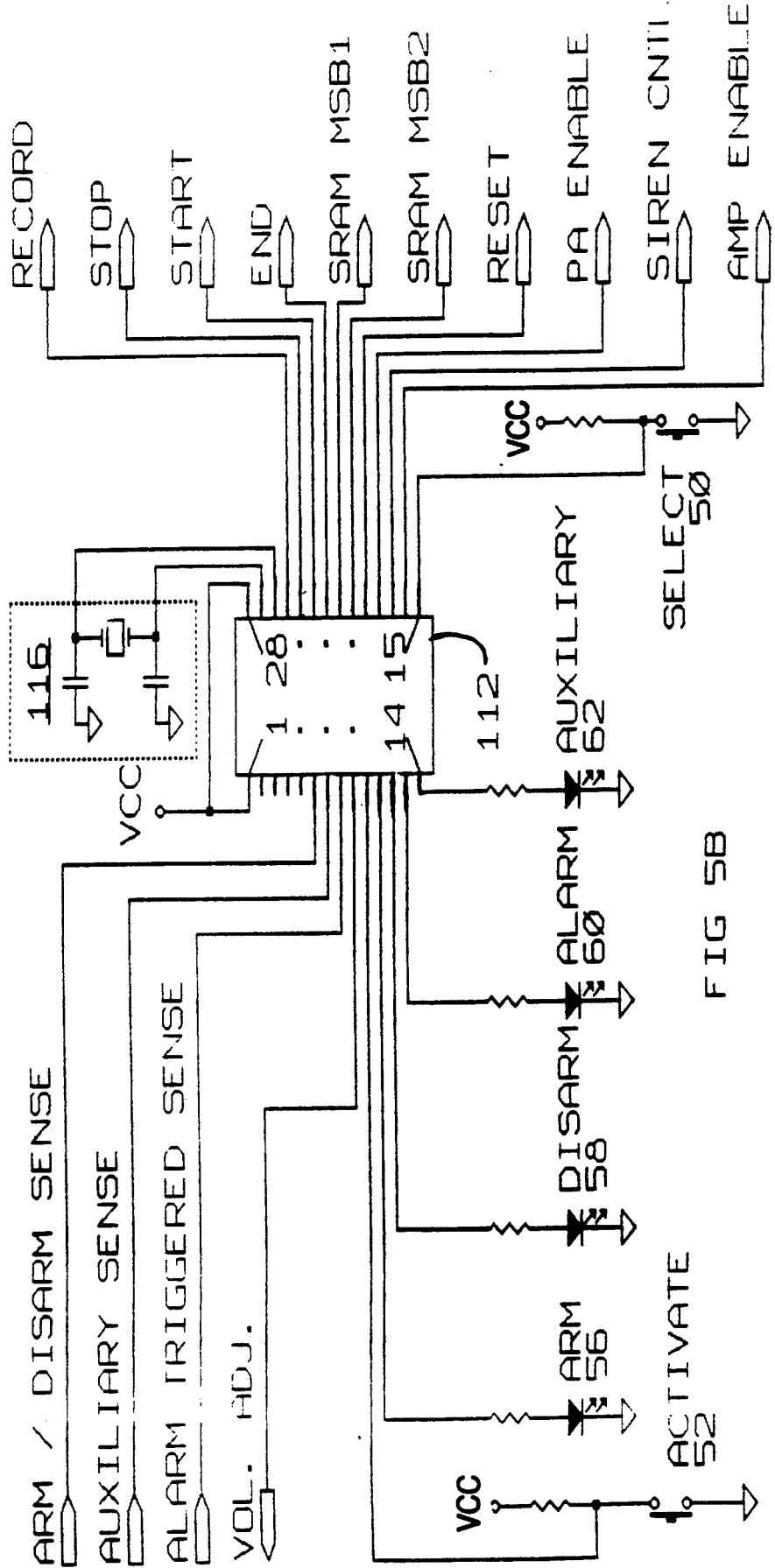

FIG. 5B shows pin assignments of the microcontroller 112, and its connection to the front panel elements select button 50, activate button 52, and status LED's 56-62. The LED's are standard components, while the buttons are identical single pole, single throw momentary on push or membrane switches, available commercially by description. The buttons are biased by pull-up resistors R11 and R17.

The microcontroller 112 contains twenty independently assignable input/output pins and is commercially available from Microchip Incorporated as part number PIC 16C55RC. By connecting the pins as shown in the figure and programming the device with simple logic instructions for interpreting inputs and driving outputs, all of the features and operations in the voice notification device 10 are controlled by the microcontroller 112. These pin assignments of microcontroller 112 are most easily understood when presented in tabular form:

| # | Input or Output | Pin Name | Function |
|---|---|---|---|
| P1 | in | arm/disarm sense | senses arm/disarm wire 66 for triggering armed & disarmed messages |
| P2 | in | auxiliary sense | senses auxiliary sensor triggered wire 72 for triggering auxiliary message |
| P3 | in | alarm triggered sense | senses alarm triggered wire 68 for triggering alarm message |
| P4 | out | vol. adj. | drives volume control 102 to high or low volume |
| P5 | in | activate | senses activate button 52 position for user control functions |
| P6 | out | arm LED | drives status LED 56 |
| P7 | out | disarm LED | drives status LED 58 |
| P8 | out | alarm LED | drives status LED 60 |
| P9 | out | auxiliary LED | drives status LED 62 |
| P10 | in | select | senses select button 50 for user control functions |
| P11 | out | amp enable | turns on amp circuit 100 during message playback and public address broadcasting |
| P12 | out | siren ctl. | activates siren disable circuit 132 |
| P13 | out | PA enable | activates live mode enable circuit 118 |
| P14 | out | reset | resets voice processor integrated circuit 92 before recording each message |
| P15 | out | SRAM MSB1 | sets first most significant address bit of static random access memories 108 and/or 110 |
| P16 | out | SRAM MSB2 | sets second most significant address bit of static random access memories 108 and/or 110 |
| P17 | in | end | reads end of message signal from voice processor integrated circuit 92 to stop playback |
| P18 | out | start | activates start of recording/playback in voice processor integrated circuit 92 |
| P19 | out | stop | activates termination of recording in voice processor integrated circuit 92 |
| P20 | out | record | toggles voice processor integrated circuit 92 between recording and playback conditions |

Figure 5C:
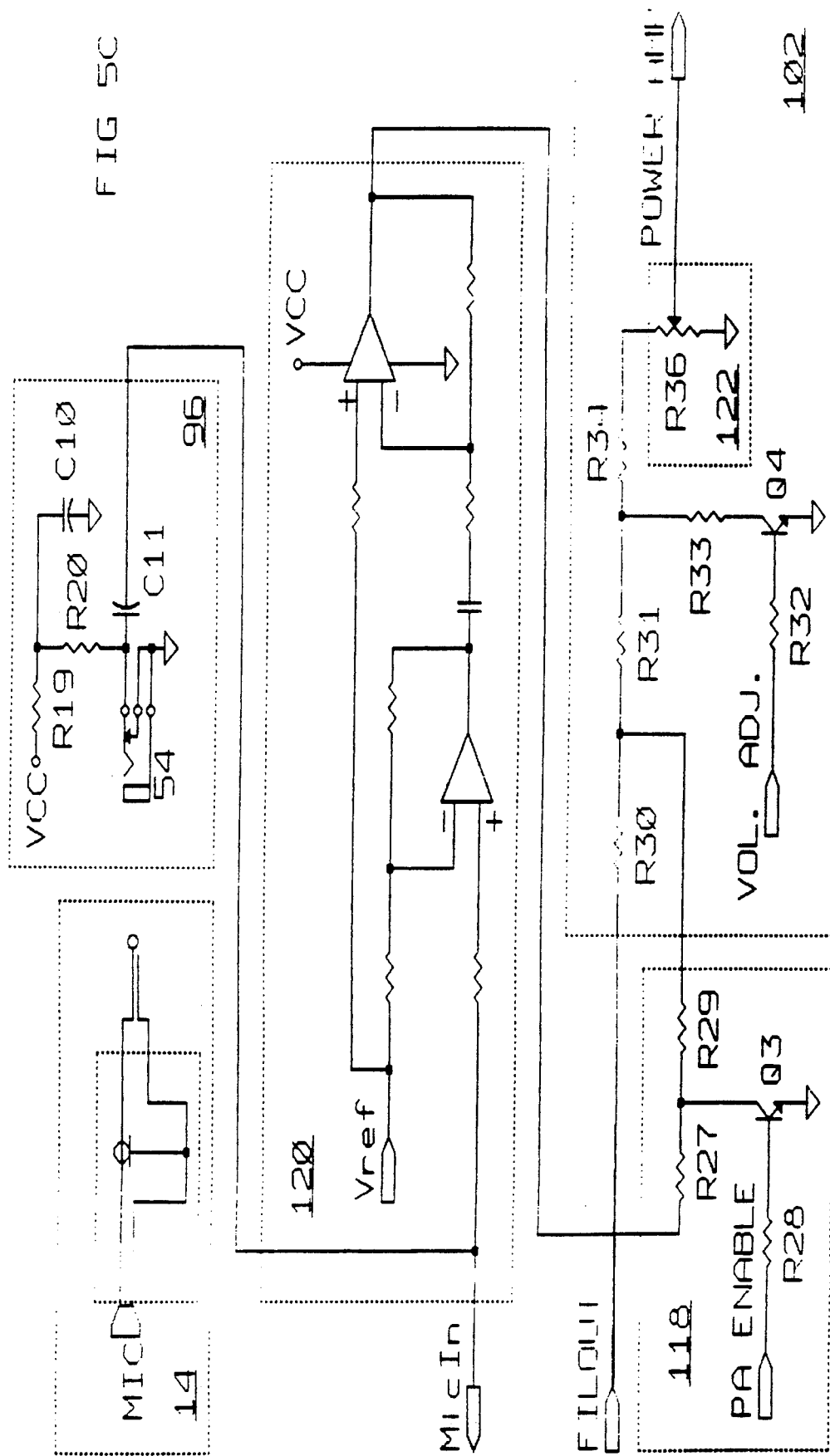

FIG. 5C shows details of the analog audio circuitry including the microphone 14, mic bias circuit 96, live mode preamp 120, live mode enable circuit 118, and volume control circuit 102.

The microphone 14 is a standard omnidirectional condenser, biased to operating voltage by capacitor C10 and resistors R19, and R20. Capacitor C11 prevents the DC microphone bias voltage from affecting the analog circuit bias within the voice processor integrated circuit 92.

The live mode preamp 120 is used because audio preamplifiers within the voice processor integrated circuit 92 are only activated during recording, so to provide the live broadcasting mode with an output volume similar to that in the playback mode, a means of providing an amplification factor of 200 is required external to the voice processing integrated circuit 92. This means is provided by live mode preamp 120, which boosts the output of mic bias circuit 96 by 200 times using a common dual-stage operational amplifier approach. The two stages are used to eliminate audible distortion potentially caused by amplification of the first stage's offset voltage, and both stages are implemented within a single commercial dual op-amp chip available from Texas Instruments, National Semiconductor, or other manufacturers as a part number LM2904N.

The live mode preamp 120 is always active, but its output is normally shunted to ground through transistor Q3 of the live mode enable circuit 118, except when the PA enable signal is brought low by the microcontroller 112. When this occurs, NPN transistor Q3 becomes an open circuit, which allows the live mode preamp 120 output to proceed through resistor R29 to the volume control circuit 102.

The volume control circuit 102 incorporates two stages, with the first consisting of transistor Q4 shunting a portion of the audio signal to ground when the volume adjust signal is brought high by microcontroller 112. This provides the microcontroller 112 with the ability to broadcast the "siren triggered" message at a louder volume than the other three messages by bringing the volume adjust signal low. In some applications of the voice processing device 10, resistor R33 may be removed during assembly, which results in all four messages being played at the higher volume level.

The second stage of the volume control circuit 102 uses a 100 k ohm audio pot R36 to pick off a signal whose volume level is dependent on the position of the pot R36. This provides a manual means for overall level adjustment.

Figure 5D:
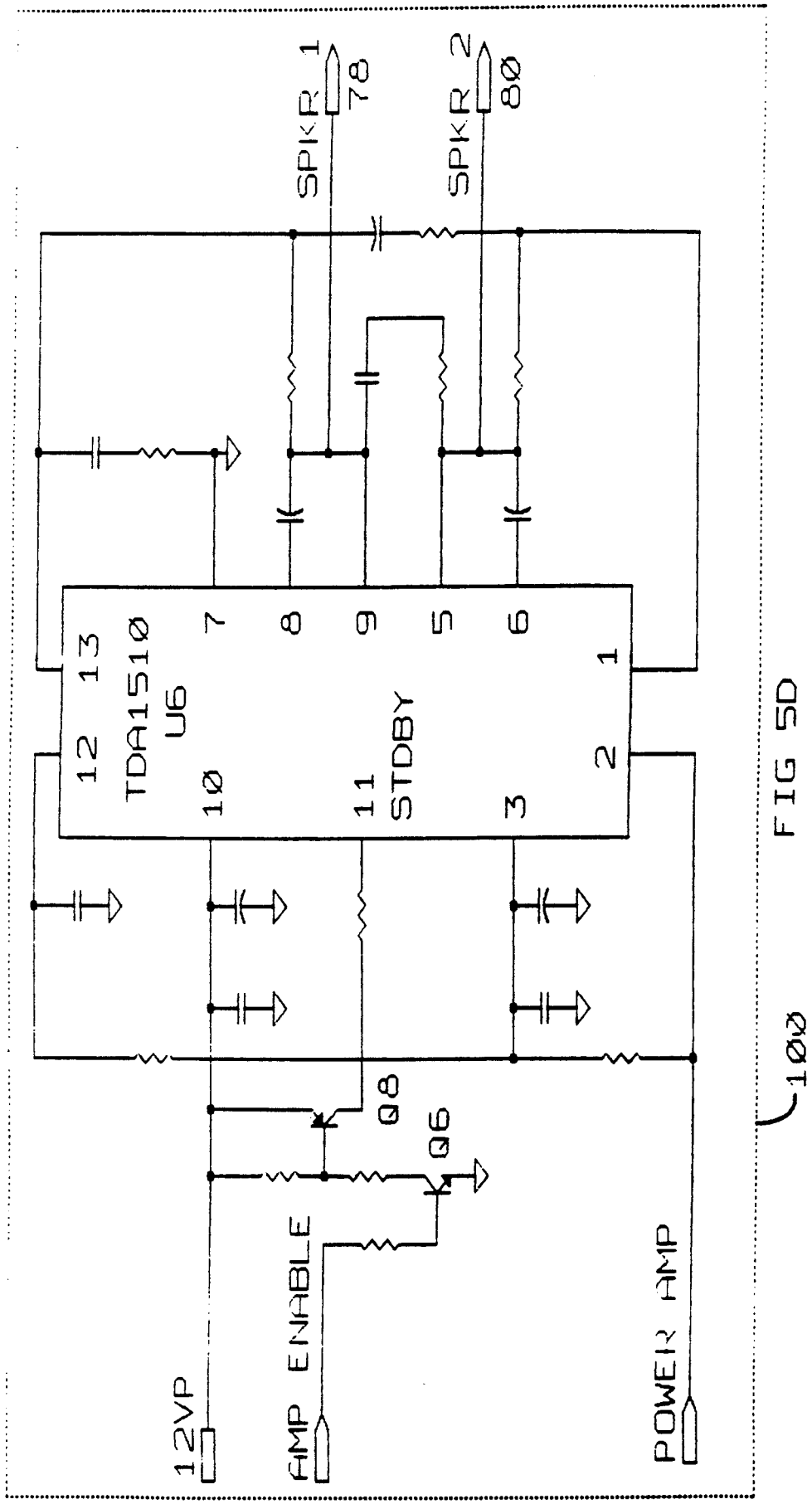

FIG. 5D shows detail of the amp circuit 100, which is constructed using for U6 a commercially available Signetics TDA1510 amplifier chip connected in a bridged output manner. The chip incorporates a built-in standby mode. This quiescent condition is achieved by leaving the amp enable signal low. When the amp enable signal is brought high immediately prior to speech broadcasting, Q6 and Q8 are turned on. This allows current from the 12 volt supply to flow to the STBY pin of the amplifier chip U6, thus putting it in the active state.

Figure 5E:
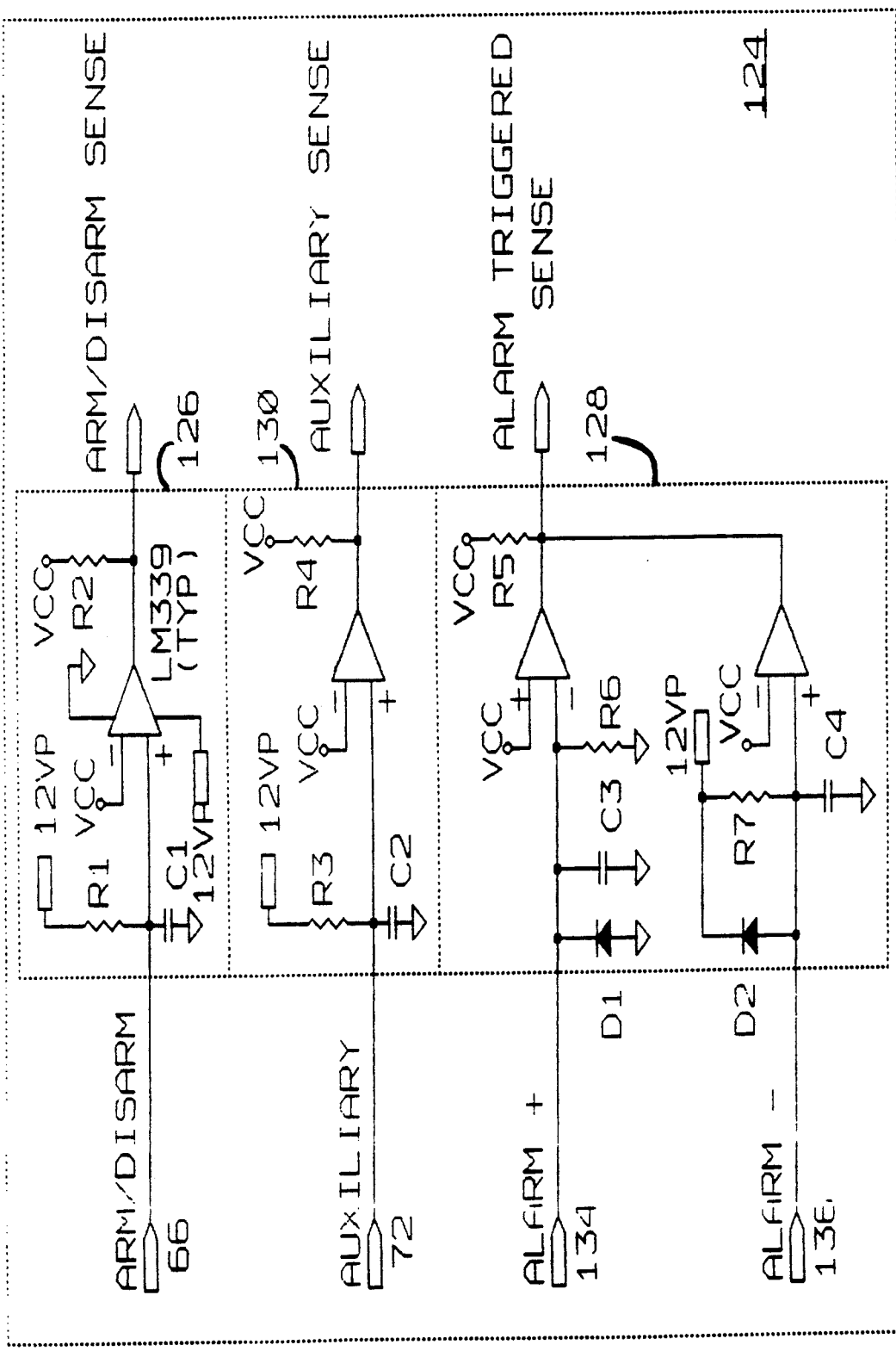

FIG. 5E shows detail of the alarm interface circuitry 124 as well as the siren disable circuit 132. The alarm interface circuitry 124 converts 12 volts to 5 volts and can be implemented using a commercially available LM339 quad open collector voltage comparator chip as U1. For the arm/disarm circuit 126, an incoming arm/disarm signal goes from 12 volts to 0 volts during arming, and goes back to 12 volts upon disarming. To process this signal, pull-up resistor R2 maintains the arm/disarm sense line at 5 volts as long as the U1A comparator output floats. When the arm/disarm wire 66's input signal goes low, the negative input of U1A goes above the positive input, which causes U1A's output to go low. The auxiliary sensor triggered circuit 130 functions identically.

The alarm triggered wire 68 can be connected to either the positive siren trigger input 134 of alarm triggered circuit 128, or it can be connected to the the negative siren trigger input 136. These two possibilities are provided for because some security alarm systems use a siren trigger output that is nominally at the power supply voltage (12 volts) and is driven to ground (0 volts) when the siren is triggered, while other security alarm systems use a siren trigger output that is nominally at ground (0 volts) and is driven to the power supply voltage (12 volts) when the siren is triggered.

The siren disable circuit 132 shows a 5 volt to 12 volt convertor that functions by turning transistor Q1 on when the siren control signal goes high, which closes transistor Q2 to drive the siren triggered wire to 12 volts. When this wire goes to 12 volts, the siren disable relay 88 opens, which disables the alarm siren 24 during message playback. In an alternate embodiment of voice notification device 10, the alarm siren 24, siren disable relay 88, and siren disable circuit 132 are omitted, in order to reduce cost by combining the siren signalling functions within the loudspeaker 18. There are several techniques available for accomplishing this combination, as for example, by adding a siren tone generation circuit in place of siren disable circuit 132, in conjunction with a circuit that combines the siren tone generator's output with the amp circuit 100's output.

FIG. 5E also shows the power regulation circuit 90. This circuit is realized using a commercially available voltage regulator in position U7, in this case a part available from Texas Instruments under part number LM7805. The associated diode D4 protects the entire device as it prevents any current from flowing if the power wire 74 and ground wire 76 are reversed during installation. Also, the high power transient voltage suppressor D5 protects the device from spikes in the input power by turning into a short circuit for power input levels above 18 volts. This device is available under the trademark "TransZorb", from General Semiconductor Industries. The capacitors C5, C6, and C9 serve to smooth any ripple in the input power supply.

Referring also now to FIG. 6 showing internal details of voice processor integrated circuit 92 as connected in FIG. 5, when the microcontroller 112 has caused voice processor integrated circuit 92 to be in a message record position by driving voice processor integrated circuit pin P51 low, phrases can be stored by holding down activate button 52, which is connected through the microcontroller 112 to start pin P54 and stop pin P53 of voice processor integrated circuit 92 in a manner such that recording is started and halted.

During recording, audio signals entering the microphone 14 are passed through the mic bias circuit 96 and are received by the voice processor integrated circuit 92 at pin P59. Following preamplification at locations 138 and 140 of the voice processor integrated circuit 92, the signal is received at location 142, where an adaptive delta modulation (ADM) circuit samples the audio signal and compresses each sample to a single bit representation of the signal's amplitude change since the prior sample. This circuit also assembles the individual bits into 8-bit bytes, suitable for storage in the static random access memories 108 and/or 110. The digital output of location 142 is sent through location 144 to the static random access memories 108 and/or 110, where each byte of data is sequentially stored for later retrieval. All timing and control functions are managed by timing generator control circuit 146, as driven by the resonator 114.

Four message segments are defined by the microcontroller 112 driving the two most significant bits of the static random access memories 108 and/or 110s' address space(s). During recording, the start and stop addresses at which storage occurs within the static random access memories 108 and/or 110 are stored in the first few bytes of each message's segment within the memory. The start address for a given phrase is loaded via the address counter 148, and each phrase's stop address is loaded via the stop address register 150 when the stop signal is received at pin P53. To erase and re-record new messages, the voice processor integrated circuit 92 incorporates a reset function, which is activated by momentarily providing power to pin P56 using the microcontroller 112.

Once phrases are recorded as described above, they may be played back by disconnecting power from pin P51 of the voice processor integrated circuit 92, causing the CPU I/F 156 to enter the play mode. When in the play mode, the invention plays back a single phrase each time activate button 52 is appropriately pressed or appropriate alarm system signals are interpreted by the microcontroller 112 to drive pin P54 high, where the particular phrase that is played depends on the signals across SRAM MSB 1 and SRAM MSB 2 as during recording.

During playback, the CPU I/F 156 controls output of the stored phrase in ADM format from static random access memories 108 and/or 110, with the signal sequentially passed through the ADM circuit 142 to convert from ADM format to digital, through the D/A convertor circuit 158 to convert from digital to analog, and through the band-pass filter 160 to eliminate acoustic artifacts created during the conversion to ADM format. The signal is then output at pin P1, and sent to volume control 102 for output as previously described.

While the invention has been shown and described with reference to particular preferred embodiments, it will be understood by those skilled in the art that various alterations and modifications in form and detail may be made therein. Accordingly, it is intended that the following claims cover all such alterations and modifications that may fall within the true spirit and scope of the invention.

What is claimed is:

1. A device for storing and replaying messages in vehicles, comprising:
   audio input means being disposed in said vehicle for receiving at least one user created audio message;
   conversion means for converting said messages into electronic signals representatives thereof;
   memory storage means for the retained storage of said electronic signals, said memory storage means being capable of storing said electronic signals in an integrated circuit device;
   memory address means acting in coordination with said memory storage means to provide a specific location within memory storage at which said electronic signals are stored;
   message selection means being provided to enable the selection for replay of any of said messages;
   message erasing means being provided to selectively erase any one or more of said messages from said memory storage means;
   replay means being activatable to cause the output of said electronic signals from said memory storage;
   input sensing means being adapted to receive signals from a vehicle condition sensing device and to activate said replay means; and
   message broadcast means being disposed in said vehicle and being activated by said replay means and functioning to broadcast said message externally from said vehicle.

2. A device as described in claim 1 wherein said input sensing means is adapted to sense the output of a security alarm device.

3. A device as described in claim 1 wherein said input means is disposed in a passenger compartment of said vehicle.

4. A device for storing and replaying messages in vehicles comprising:
   audio input means for receiving a user created audio message;
   conversion means for converting said message into electronic signals representative thereof;
   memory storage means for the retained storage of said electronic signals, said memory storage means being capable of storing said electronic signals in an integrated circuit device;
   memory address means acting in coordination with said memory storage means to provide a known location within said memory storage at which said electronic signals are stored;
   input sensing means, said input sensing means being adapted to receive signals from a vehicle condition sensing device and to activate a replay means;
   replay means being activatable to cause the output of said electronic signals from said memory storage;
   message broadcast means being activated by said replay means and functioning to broadcast said message contained in said electronic signals externally of said vehicle; and
   said replay means functioning to repeatedly cause the outputting of said electronic signals from said memory storage for repeated message broadcasting for as long as said replay means is activated by said input sensing means.

5. A device as described in claim 4 wherein said audio input means is disposed away from a passenger compartment of said vehicle and said message broadcast means is disposed away from said passenger compartment of said vehicle.

6. A device as described in claim 4 wherein said input sensing means is adapted to sense the output of a security alarm device.

7. A device as described in claim 4 wherein all content of said message that is stored within said memory storage means is input by the user of the device.

8. A device for storing and replaying messages in vehicles comprising:
   audio input means for receiving a plurality of user created audio messages from a user of said device;
   conversion means for converting said audio messages into electronic signals representative thereof;
   signal processor means including an erasable memory storage means, said signal processor means functioning to receive said electronic signals, convert said electronic signals into converted signals having an electronically storable format and transmit said converted signals to said erasable memory storage means, said erasable memory storage means functioning to store a plurality of said audio messages in the form of said converted signals;

said signal processor means further including a memory address means adapted to identify and store an address value representative of the location of each said audio message stored in said erasable memory storage means;

user contol means being provided to adapt said device for the recording of said user's audio messages or the replay of said user's audio messages from said erasable memory storage means;

selectable message erasure means, being activatable by said user to erase any selected one of said plurality of audio messages from said erasable memory storage means;

audio message replay means functioning to transmit a selected particular one of said user's audio messages from said erasable memory storage means to said signal processor means, said user's audio message being converted by said signal processor means from a converted signal to an analog signal representative of said selected user's audio message; and message broadcast means functioning to receive said analog signal and convert it into an audible signal, whereby said selected user's audio message will be audibly broadcast by said message broadcast means.

9. A device as described in claim 1, or 8 wherein all content of said messages that are stored within said memory storage means is input by the user of the device.

10. A device as described in claims 1, 4 or 8 wherein a control means is provided to cause said message to be broadcast and to cause an alarm signal to be broadcast in an alternating manner.

11. A device as described in claims 1, 4 or 8 wherein a control means is provided to cause said message to be broadcast and to thereafter cause an alarm signal to be broadcast.

12. A device as described in claim 8 further including an input sensing means, said input sensing means being adapted to sense an output signal of a security alarm device and to activate said replay means.

13. A device as described in claim 1, 4 or 8 further including a software programmable microprocessor adapted to monitor said alarm input sensing means and to control said conversion means, said memory storage means, said memory address means and said replay means.

14. A device as described in claim 1, 4 or 8 wherein a user-selectable means is provided for selection of real time broadcasting of user voice messages from said audio input means.

15. A device as described in claims 1, 4 or 12 wherein said replay means is activatable by a portable remote control transmitter means, whereby a user of said transmitter means may activate said replay means to cause the broadcasting of a message.

16. A device as described in claim 1 or 12 wherein said input sensing means is adapted to sense a first proximity zone warning signal to activate said replay means to cause a first message to be broadcast, and wherein said input sensing means is adapted to sense the output of a second proximity zone warning signal to activate said replay means to cause the outputting of an audio signal through said message broadcast means.

17. A device for storing audio messages and replaying said messsages in vehicle, comprising:

message receiving means for receiving electronic signals representative of at least one user selected audio message;

memory storage means for the retained storage of said electronic signals, said memory storage means being capable of storing said electronic signals in an integrated circuit device;

memory address means acting in coordination with said memory storage means to provide a specific location within said memory storage at which said electronic signals are stored;

message selection means being provided to enable the selection for replay of any of said messages;

replay means being activatable to cause the output of said electronic signals from said memory storage;

input sensing means being adapted to receive signals from a vehicle condition sensing device and to activate said replay means; and message broadcast means being disposed in said vehicle and being activated by said replay means and functioning to broadcast said message externally from said vehicle.

18. A device as described in claim 1, 4, 8 or 17 further including external sensor connection means being provided to permit the connection of external sensor devices for triggering message broadcasting.

19. A device for storing and replaying messages as described in claims 1, 4, 8 or 17 further including an amplifier means, said amplifier means being powered by electrical energy from a battery associated with said vehicle and functioning to amplify said electronic signals and to transmit said amplified electronic signals to said message broadcast means; and wherein said replay means further functions to control said electrical power to said amplifier, whereby, when said replay means is activated it functions to cause electrical power to flow to said amplifier, and when said replay means is not activated substantially less electrical power flows to said amplifier, whereby said vehicle's battery power is conserved.

20. A device as described in claims 1, 12 or 17 wherein said replay means functioning to repeatedly cause the outputting of said electronic signals from said memory storage for repeated broadcasting of a message for as long as said replay means is activated by said input sensing means.

21. A device as described in claim 17 wherein said input sensing means is adapted to sense the output of a security alarm device.

22. A device as described in claim 1, 2, 21, 4, 8 or 17 wherein a single transducer is utilized to broadcast both an alarm signal and said audio message.

23. A device as described in claim 2, 21, 6 or 12 including a disabling means that functions to temporarily disable an alarm signalling device engaged to said security alarm device during message broadcasting.

24. A device as described in claim 23 wherein said disabling means further functions to operatively connect said alarm signalling device to said security alarm device in the event that portions of said device for storing and replaying messages in vehicles becomes disabled.

25. A device as described in claim 2, 21, 6 or 12 further incorporating a user-selectable disabling mode functioning to cause said security alarm device to operate in an unimpeded manner.

26. A device as described in claim 2, 21, 6 or 12 further including a user-signalling means that is enabled by said device to provide a user alarm activation signal, indicating to the user that said security alarm device has been triggered in the user's absence.

27. A device as described in claim 26 including a recording means which functions to record the occurrence of alarm triggering, and wherein said user alarm activation signal is provided during the first subsequent disarming event.

28. A device as described in claims 2, 21 or 12 wherein said replay means is activatable by conditions proximate said vehicle to cause the broadcasting of one of said messages, and said replay means is activatable by said output of said security alarm device to cause the broadcasting of a different one of said messages.

29. A device as described in claims 2, 21, 6 or 12 wherein said input sensing means is adapted to sense a first proximity zone warning signal to activate said replay means to cause a first message to be broadcast, and wherein a second proximity zone warning signal activates an alarm sensing device to cause the output of an alarm activation signal to said input sensing means, whereby an alarm signal is broadcast.

30. A device for storing and broadcasting messages from a vehicle, comprising:

means to audibly identify specific characteristics of a specific vehicle that has been tampered with, said means including a message storage means, a message replay means, an input sensing means that functions to activate said message replay means, and a message broadcast means that functions to broadcast a message that audibly identifies said specific characteristics of said vehicle.

31. A device as described in claim 30 wherein said means to audibly identify specific characteristics of a specific vehicle also includes an audible message input means which functions to permit a user to input an audible message that identifies specific characteristics of said specific vehicle into said memory storage means.

* * * * *